US010108029B2

(12) United States Patent
Chen

(10) Patent No.: US 10,108,029 B2
(45) Date of Patent: Oct. 23, 2018

(54) SEALANT COMPOSITION

(71) Applicant: HENKEL AG & CO. KGAA, Duesseldorf (DE)

(72) Inventor: Chenfu Chen, Kanagawa-ken (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 328 days.

(21) Appl. No.: 14/190,798

(22) Filed: Feb. 26, 2014

(65) Prior Publication Data

US 2014/0242301 A1  Aug. 28, 2014

Related U.S. Application Data

(63) Continuation of application No. PCT/JP2011/071757, filed on Sep. 15, 2011.

(51) Int. Cl.
G02F 1/00        (2006.01)
C09K 3/10        (2006.01)
C08G 59/17       (2006.01)
C08G 59/40       (2006.01)
C08G 59/50       (2006.01)
C08L 63/10       (2006.01)
C08F 299/02      (2006.01)
G02F 1/1339      (2006.01)
G02F 1/1333      (2006.01)

(52) U.S. Cl.
CPC ........ *G02F 1/0009* (2013.01); *C08F 299/024* (2013.01); *C08G 59/1466* (2013.01); *C08G 59/4042* (2013.01); *C08G 59/50* (2013.01); *C08L 63/10* (2013.01); *C09K 3/10* (2013.01); *B32B 2457/202* (2013.01); *C09K 2003/1059* (2013.01); *C09K 2003/1062* (2013.01); *C09K 2200/061* (2013.01); *C09K 2200/0647* (2013.01); *G02F 1/1339* (2013.01); *G02F 1/133305* (2013.01); *Y10T 428/1073* (2015.01)

(58) Field of Classification Search
None
See application file for complete search history.

(56) References Cited

U.S. PATENT DOCUMENTS

| 5,973,166 | A | 10/1999 | Mizori et al. | |
| 2009/0250166 | A1* | 10/2009 | Pachl | C08F 2/48 156/308.2 |
| 2011/0086936 | A1* | 4/2011 | Son | C08L 63/00 522/37 |
| 2011/0218267 | A1* | 9/2011 | Shinano | C09K 3/10 522/66 |

FOREIGN PATENT DOCUMENTS

| JP | 60147421 A | 8/1985 |
| JP | 60147424 A | 8/1985 |
| JP | 2001142086 A | 5/2001 |
| JP | 2001174099 A | 6/2001 |
| JP | 2004117890 A | 4/2004 |
| JP | 2005194508 A | 7/2005 |
| JP | 2006008819 A | 1/2006 |
| JP | 2006330301 A | 12/2006 |
| JP | 3920511 B | 2/2007 |
| JP | 3968208 B2 | 8/2007 |
| JP | 2008231347 A | 10/2008 |
| JP | 2009051954 A | 3/2009 |
| JP | 4358505 B | 11/2009 |
| JP | 201020286 A | 1/2010 |
| JP | 2010020286 A * | 1/2010 |
| KR | 10-2009-0129959 A | 12/2009 |
| WO | 2001098411 A1 | 12/2001 |

OTHER PUBLICATIONS

"Curing Agents for Epoxy Resin", Three Bond Technical News, Dec. 20, 1990, p. 4 Retrieved from https://www.threebond.co.jp/en/technical/technicalnews/pdf/tech32.pdf.

* cited by examiner

Primary Examiner — Anthony J Frost
(74) Attorney, Agent, or Firm — Taylor M. Coon

(57) ABSTRACT

A sealant composition particularly suitable for a plastic substrate is disclosed. The sealant composition contains: a partially (meth)acrylated epoxy resin, a hydrophobic oligomer having a flexible hydrophobic backbone moiety and at least one functional group co-curable with the partially (meth)acrylated epoxy resin, and a latent epoxy-curing agent.

10 Claims, No Drawings

SEALANT COMPOSITION

CROSS-REFERENCE TO RELATED APPLICATIONS

This application is a continuation of International Patent Application No. PCT/JP2011/071757 filed Sep. 15, 2011, the contents of which are incorporated herein by reference.

TECHNICAL FIELD

The present invention relates to a sealant composition, particularly the sealant composition most suitable for liquid crystal displays having a plastic substrate.

BACKGROUND OF THE INVENTION

Glass substrates have been used as substrates for Liquid Crystal displays (LCD). The Glass substrate has very good performance. However, it encounters more and more limitations in latest applications, because it is rigid, not flexible, easily broken and difficult for manufacturing thinner panel, and in addition cost is high.

A flexible plastic substrate is introduced to resolve these problems. However, current available sealant materials can not be used for flexible plastic substrate LCD panel assembly due to too big difference between plastic and glass substrates, especially in terms of thermal expansion property and cure temperature restriction.

Therefore, there has been a great demand fora new type sealant technology having good reliability performance and suited for the flexible plastic substrate.

Attempts of lowering the curing temperature have been carried out in the past, but the results are still not satisfactory. In patent document 1 (WO2001/098411; JP-B-4358505), thermal curability at 80° C. was reached but it is two-component composition, difficult to be handled in real panel assembly process. For compositions disclosed in patent document 2 (JP-A-2001-174099; JP-B-3968208) and patent document 3 (JP-A-2001-142086; JP-B-3920511), cure temperature of at least 110° C. is necessary, which is still high for most flexible plastic substrates. In addition, flexibility of these proposed compositions was not satisfactory enough.

DETAILED DESCRIPTION OF THE INVENTION

Technical Problem

The present invention has the objective of providing a sealant composition suitable for the sealing application of plastic substrates, particularly LCDs having a plastic substrate.

Solution to Problem

The present invention relates to the following items.
1. A sealant composition comprising:
a partially (meth)acrylated epoxy resin,
a hydrophobic oligomer having a flexible hydrophobic backbone moiety and at least one functional group co-curable with the partially (meth)acrylated epoxy resin, and
a latent epoxy-curing agent.
2. A sealant composition according to the above item 1, further comprising a maleimide compound and/or a photo initiator, with the proviso that the maleimide compound is selected from compounds that are different from the hydrophobic oligomer if the hydrophobic oligomer have a maleimide group.
3. A sealant composition according to the above item 1 or 2, wherein the backbone moiety of the hydrophobic oligomer comprises a block of 1,3-conjugated dien monomer units, wherein the block of 1,3-conjugated dien monomer units may be optionally partially or entirely hydrogenated.
4. A sealant composition according to any one of the above items 1 to 3, wherein the functional group of the hydrophobic oligomer is selected from the group consisting of (meth)acryloyl group, epoxy group and maleimide group.
5. A sealant composition according to the above item 4, wherein the hydrophobic oligomer is selected from the group consisting of (meth)acrylate-modified polybutadiene, maleimide-modified polybutadiene, epoxy-modified or epoxylated polybutadiene, wherein a polybutadiene-backbone moiety may be optionally partially or entirely hydrogenated.
6. A sealant composition according to any one of the above items 1 to 5, wherein the latent epoxy-curing agent is selected such that the sealant composition is cured at 100° C. or lower.
7. A sealant composition according to any one of the above items 1 to 6, which is used for sealing a plastic substrate.
8. A sealant composition according to the above item 7, which is used for sealing the plastic substrate for a liquid crystal display.
9. Use of a sealant composition according to any one of the above items 1 to 6 in a sealing application of a plastic substrate.
10. Use of a sealant composition according to the above item 9 in the sealing application of the plastic substrate for a liquid crystal display.
11. A method for manufacturing a liquid crystal display having a liquid crystalline layer between a first substrate and a second substrate, by means of a liquid-crystal-one-drop-filling process, wherein the first substrate and the second substrate are formed of plastic;
the method comprising the steps of:
(a) applying the sealant composition according to any one of claims 1 to 10 on a sealing region at periphery of a surface of the first substrate;
(b) dropping liquid crystalline composition on a central area encircled by the sealing region of the surface of the first substrate;
(c) overlaying the second substrate on the first substrate;
(d) performing temporal fixation by photoirradiating the sealant composition; and
(e) performing final fixation by heating the sealant composition.
12. A method according to the above item 11, wherein the heating is performed at 100° C. or lower.

Advantageous Effect of Invention

According to the present invention, there is provided a sealant composition suitable for the sealing application of plastic substrates, particularly LCDs having a plastic substrate.

The sealant composition of the present invention is a combination of a hydrophobic oligomer and an epoxy system curable at a lowered temperature (but, higher than room temperature), which results in a cured product having flexibility as well as a barrier property against moisture. Since it is both photo-curable and thermally curable, it is suitable for the typical ODF process (one drop fill process in LCD manufacturing). In addition, thermal curing may be carried out not higher than about 100° C. which may be a limit temperature for ordinary plastic substrates, preferably not higher than about 80° C. and even at about 60° C. in the specific embodiment.

In a certain embodiment, a photo initiator, which turns into a contaminant, may not be used in the composition at all or may be used in lesser amount than ever before. Therefore, the degradation of liquid crystal can also be reduced.

DESCRIPTION OF EMBODIMENTS

As mentioned above, the sealant composition of the present invention contains a partially (meth)acrylated epoxy resin, a hydrophobic oligomer having a flexible hydrophobic backbone moiety and at least one functional group co-curable with the partially (meth)acrylated epoxy resin, and a latent epoxy-curing agent.

In its molecule, the partially (meth)acrylated epoxy resin has at least one (meth)acrylate group (that is to say (meth) acryloyloxy group) and at least one epoxy group. As shown in the formula described below, the partially (meth)acrylated epoxy resin is the resin having the structure in which (meth)acrylate group is introduced into a part of the epoxy groups in the epoxy resin. In the present application, the notation of (meth)acryl denotes both acryl and methacryl as commonly used. The same applies to other (meth)acrylate, (meth)acryloyl and the like.

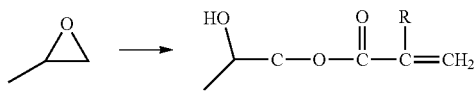

(In the formula, R is H or CH$_3$.)

While the resins in which (meth)acrylate groups are introduced into the entire epoxy groups in an epoxy resin are generally referred to as "epoxyacrylate", the partially (meth) acrylated epoxy resin is the resin in which (meth)acrylation has been partially achieved.

The epoxy resins used as the base of the partially (meth) acrylated epoxy resin include, but not limited to, bisphenol-type epoxy resins such as bisphenol-A-type epoxy resins, bisphenol-F-type epoxy resins and bisphenol-S-type epoxy resins; novolac-type epoxy resins such as phenol novolac-type epoxy resins and cresol-novolac-type epoxy resins; biphenyl-type epoxy resins; hydrogenated bisphenol-type epoxy resins (those in which the benzene-ring in bisphenol-type epoxy resins such as bisphenol-A-type epoxy resins, bisphenol-F-type epoxy resins and bisphenol-S-type epoxy resins is hydrogenated); dicyclopentadiene-type epoxy resins such as glycidyl ether of dicyclopentadiene phenol novorac; and cyclohexanedimethanol diglycidyl ether. The epoxy resin has two or more epoxy groups in its molecule, and the epoxy equivalent of the resin may be selected as appropriate.

It is preferred that the partially (meth)acrylated epoxy resin has a molecular weight such that the resin becomes liquid. It is preferably liquid and has a viscosity in a range from 1,000 to 1,000,000 cps, more preferably a viscosity in a range from 2,000 to 700,000 cps at 25° C.

The hydrophobic oligomer has a flexible hydrophobic backbone moiety in the main chain of its molecule. The flexible hydrophobic backbone moiety is preferably flexible hydrocarbon group, particularly preferably aliphatic hydrocarbon chain. The flexible hydrophobic backbone moiety preferably has no group readily rendering hydrophilicity, for example, polar group such as O, CO and S. The best preference is given to a methylene chain in which adjacent carbon atoms may form a double bond one another and the chain may have aliphatic pendant groups. The flexible hydrophobic backbone moiety provides flexibility to the cured products of the sealant composition of the present invention, and at the same time reduces its moisture permeability. This makes the sealant composition of the present invention particularly suitable for sealing a flexible plastic substrate, which has an effect in protecting liquid crystal from outside moisture in the case of LCD.

Although the hydrophobic backbone moiety is not particularly limited as long as it has properties described above, the moiety preferably comprises the block consisting of the 1,3-conjugated dien monomer unit and the entire hydrophobic backbone moiety may be constituted with the 1,3-conjugated dien monomer unit. Here, the term, "monomer unit" means the repeating unit formed by polymerizing a monomer. The block consisting of the 1,3-conjugated dien monomer unit may be optionally partially or entirely hydrogenated.

The 1,3-conjugated dien monomer forming the hydrophobic backbone moiety is preferably butadiene and/or isoprene. In the oligomer block, the 1,3-conjugated dien monomer unit may exist in the form of 1,4-addition unit or 1,2-addition unit, and when both units exist, the respective units may form sub-blocks or may coexist randomly.

The hydrophobic oligomer also has at least one functional group. The functional group renders the hydrophobic oligomer co-curable with the partially (meth)acrylated epoxy resin. Therefore, this group is a group capable of participating in photo-polymerization reaction with (meth)acrylate group or a group capable of participating in a co-curing reaction with epoxy group. As a specific example of the functional group, preference is given to (meth)acryloyl group (specifically as (meth)acrylate group), epoxy group (specifically as diglycidyl ether group, diglycidyl ester group and the like) and maleimide group.

The number of the functional groups in the hydrophobic oligomer is preferably 2 or more and generally, for example, not more than 20 and preferably about 2 to 6. The functional group may be located at the end of the oligomer or may exist as a pendant group pendent from the main chain, if necessary, via a mediating group, or may exist in the both manners. In a specific preferred embodiment, the functional group is located at the end of the oligomer.

The hydrophobic oligomer has a viscosity of preferably about 10 Pa·s to about 1000 Pa·s, more preferably about 20 Pa·s to about 700 Pa·s. Alternatively, preferred is a hydrophobic oligomer having a molecular weight in a range of about 300 to about 50,000, more preferably about 1000 to about 50,000.

The term "oligomer" in "hydrophobic oligomer" is not explicitly distinguished from "polymer", but is used to mean polymer having relatively low molecular weight (ex. enabling it to be a liquid form).

The functional group may be bonded directly to the hydrophobic backbone moiety or may be bonded to it via a linking group. Since as described later, for example, liquid polybutadienes and the like having hydroxyl group or carboxyl group is used as a source material for the hydrophobic backbone moiety, the linking group includes the group produced by a reaction with hydroxyl group or carboxyl group, for example, such as urethane linkage, ester linkage and the like.

The hydrophobic oligomer having the block of polybutadiene as the hydrophobic backbone moiety and (meth)acrylate group as the functional group includes, as a specific example, liquid polybutadiene (meth)acrylate obtained by urethane addition reaction of 2-hydroxyethyl (meth)acrylate with liquid polybutadiene having hydroxyl group through 2,4-tolylene diisocyanate; liquid polybutadiene (meth)acrylate obtained by esterification reaction of 2-hydroxy (meth)acrylate with maleinated polybutadiene where maleic anhydride was added by ene addition reaction; liquid polybutadiene (meth)acrylate obtained by epoxy-esterification reaction of glycidyl (meth)acrylate with liquid polybutadiene having; liquid polybutadiene (meth)acrylate obtained by esterification reaction of (meth)acrylic acid with epoxidized polybutadiene obtained by reacting epoxidation agent on liquid polybutadiene; liquid polybutadiene (meth)acrylate obtained by dehydrochlorination reaction of (meth)acryloyl chloride with liquid polybutadiene having hydroxyl group; liquid hydrogenated 1,2-polybutadiene (meth)acrylate obtained by modification of liquid 1,2-polybutadiene glycol with urethane-(meth)acrylate and the like.

Formulae of specific examples of the liquid polybutadiene (meth)acrylate are shown below.

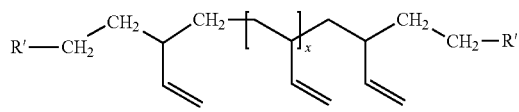

wherein R':

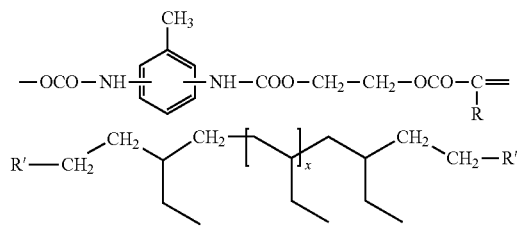

wherein R':

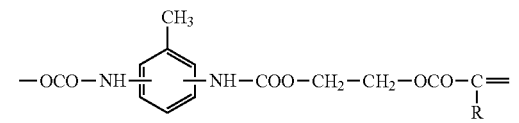

wherein, R denotes H or CH$_3$; x denotes repeat number of monomer unit in [ ], and is an integer 0 or larger and selected so that the oligomer exhibits a liquid form, preferably having the preferred viscosity and/or the preferred molecular weight mentioned above.

The hydrophobic oligomer having the block of polyisoprene as the hydrophobic backbone moiety and (meth)acrylate group as the functional group includes those in which the block of polybutadiene described above has been replaced with the block of polyisoprene.

The hydrophobic oligomers mentioned above are available, for example, under the product names of TEA-1000 and TE-2000 from Nippon Soda Co., Ltd., the product names of BAC-45, BAC-15, SPBDA-30, Spbda-50 from Osaka Organic Chemical Industry Ltd., and the product names of CN301, CN303, CN307, CN9014 from Sartomer Company Inc.

Furthermore, the hydrophobic oligomer in which (meth)acryloyloxy group is bonded directly to the block of polybutadiene includes the following structure:

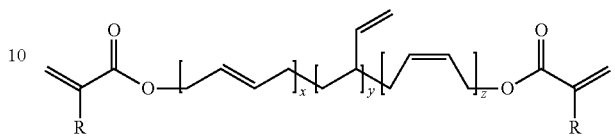

in which, x, y and z denote repeat number of monomer unit, and they are an integer 0 or larger wherein x+y+z is larger than 0 and they are selected so that the oligomer exhibits a liquid form, preferably having the preferred viscosity and/or the preferred molecular weight mentioned above. R denotes H or CH$_3$. The structure in the parentheses [ ] shows structures that the butadiene monomer unit can take, and all three structures may exist or only one or two structures may exist. In addition, x, y and z indicate the sum of repeat numbers of respective units when there are two or more structures of the parentheses [ ], and they may exist in block form or may exist in random.

The hydrophobic oligomer in which (meth)acryloyloxy group is bonded directly to the block of isoprene includes the following structure:

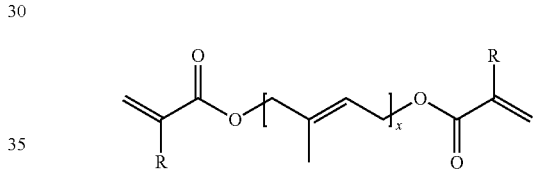

in which, x indicates a repeat number of monomer unit, and it is an integer not less than 1 and selected so that the oligomer exhibits a liquid form, preferably having the preferred viscosity and/or the preferred molecular weight mentioned above. R denotes H or CH$_3$. The structure in the parentheses [ ] shows the representative structure on which the isoprene monomer unit can take, and the structure may be 1,4-cis structure or 1,2-trans structure as another form. The structure may exist in block form or may exist randomly when two or more different structures exist.

The hydrophobic oligomer having the block of polybutadiene or polyisoprene as the hydrophobic backbone moiety and epoxy group as the functional group includes, for example, the epoxy resin-modified polybutadiene or polyisoprene oligomer which are obtained by reacting epoxy resin with liquid polybutadiene or polyisoprene having carboxyl group. The hydrophobic oligomer having epoxy group as the functional group can be also obtained by epoxidizing a portion of double bonds of the block of polybutadiene or polyisoprene. These oligomers are available under the commercial name of EPB-13 and JP-200 from Nippon Soda Co., Ltd.

The hydrophobic oligomer having the block of polybutadiene or polyisoprene as the hydrophobic backbone moiety and maleimide group as the functional group can include the oligomers and hydrogenated products thereof, in which maleimide group is bonded to the block of polybutadiene or polyisoprene through, for example, oxycarbonylalkylene (—O—CO-alkylene-). The representative structure is shown as follows:

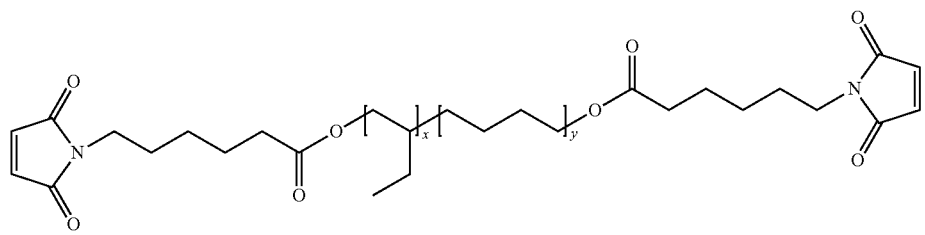

in which, the block of polybutadiene in the parentheses [ ] may be a structure not hydrogenated though it shows the hydrogenated product, and x and y indicate a repeat number of monomer unit, and they are each an integer of 0 or larger wherein x+y is larger than 0 and they are selected so that the oligomer exhibits a liquid form, preferably having the preferred viscosity and/or the preferred molecular weight mentioned above. When there are two or more structures in the parentheses [ ], x and y indicate the sum of repeat numbers of respective units and they may exist in block form or may exist randomly.

These polybutadiene bismaleimides are commercially available from Henkel Corporation.

The amount of the hydrophobic oligomer contained in the sealant composition is preferably not less than 4 parts by weight, more preferably not less than 6 parts by weight, yet preferably not less than 10 parts by weight, and preferably not more than 2,000 parts by weight, more preferably not more than 1,000 parts by weight, yet preferably not more than 500 parts by weight, most preferably not more than 200 parts by weight on the basis of 100 parts by weight of the partially (meth)acrylated epoxy resin.

The latent epoxy-curing agent (i.e. latent hardener) to be used in the present invention cures the epoxy resin when heated (i.e. when a temperature is raised beyond room temperature). Since the present invention is intended particularly for the sealant application of plastic substrates, the latent epoxy-curing agent is preferably those curable at a temperature not more than 100° C., more preferably those curable at a temperature not more than 80° C. These are also preferably those with onset of curing at 40° C. or higher, in particular preferably those with onset of curing at 45° C. or higher.

Specifically, the latent epoxy-curing agent to be preferably used in the present invention includes amine-based compound hardener, fine-powder-type modified-amine-based and modified-imidazole-based latent hardeners. The modified-amine-based and modified imidazole-based latent hardeners include core-shell type hardeners in which the surface of an amine compound (or amine adducts) core is coated with the shell of a modified amine product (surface adduction and the like) and master-batch type hardeners as a blend of the core-shell type curing agent with an epoxy resin.

These latent epoxy-curing agents are known to a person skilled in the art (for example, see JP-A-2010-20286), and those usable within the range of temperature describe above may be selected and used with respect to the objective of the present invention. For example, the usable latent curing agent available commercially includes "Adeca Hardener EH-4357S" (trademark of ADEKA Co.; modified-amine-type), "Adeca Hardener EH-4357PK" (trademark of ADEKA Co.; modified-amine-type), "Adeca Hardener EH-4380S" (trademark of ADEKA Co.; special hybrid-type), "Fujicure FXR-1081" (trademark of T&K TOKA Corporation; modified-amine-type), "Fujicure FXR-1020" (trademark of T&K TOKA Corporation; modified-amine-type), "Sunmide LH-210" (trademark of Air Products Japan Inc.; modified-imidazole-type), "Sunmide LH-2102" (trademark of Air Products Japan Inc.; modified-imidazole-type), "Sunmide LH-2100" (trademark of Air Products Japan Inc.; modified-imidazole-type), "Ajicure PN-23" (trademark of Ajinomoto Fine-Techno Co., Inc.; modified-imidazole-type), "Ajicure PN-F" (trademark of Ajinomoto Fine-Techno Co., Inc.; modified-imidazole-type), "Ajicure PN-23J" (trademark of Ajinomoto Fine-Techno Co., Inc.; modified-imidazole-type), "Ajicure PN-31" (trademark of Ajinomoto Fine-Techno Co., Inc.; modified-imidazole-type), "Ajicure PN-31J" (trademark of Ajinomoto Fine-Techno Co., Inc.; modified-imidazole-type), and the like.

An amount of the latent epoxy-curing agent contained in the sealant composition may be appropriately selected depending on the kind of the latent hardener. For example, the amount of the latent epoxy-curing agent is 0.5 to 500 parts by weight, preferably 1 to 200 parts by weight, more preferably 1 to 100 parts by weight, and further preferably 2 to 50 parts by weight, based on 100 parts by weight of the sum of the partially (meth)acrylated epoxy resin and, if present, epoxy resins.

It is preferred that the sealant composition of the present invention further contains a maleimide compound and/or photo initiator. It is particularly preferred to contain a maleimide compound. When the hydrophobic oligomer has no maleimide group, the sealant composition in particular preferably contains a maleimide compound.

The maleimide compound has function to initiate polymerization by photoirradiation, in particular UV irradiation, and also has function to perform polymerization (copolymerization) with the (meth)acrylate group of the partially (meth)acrylated epoxy resin. The unreacted portion during photoirradiation are cured finally as heated.

Therefore, a photo initiator may not be used in the sealant composition when the maleimide compound is present. When the hydrophobic oligomer having maleimide group is used as the hydrophobic oligomer, neither the maleimide compound nor photo initiator is necessary in the composition. Nevertheless, the maleimide compound and/or photo initiator, particularly preferably the maleimide compound may be further added with consideration of properties as a whole.

A photo initiator is usually a low-molecular-weight molecule, which generates decomposed substances by photofragmentation. For this reason, a photo initiator may adversely affect liquid crystal. When therefore, the sealant composition contains the hydrophobic oligomer having maleimide group and/or the maleimide compound, a photo initiator is not used at all, or its usage may be reduced even in the case of use. In a specific preferred embodiment, the sealant composition of the present invention contains no photo curing initiator at all.

The maleimide compound has one or more, preferably one or two substructures represented by moiety (I):

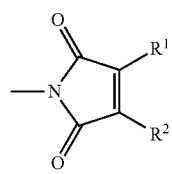
(I)

in its molecule. $R^1$ and $R^2$ denote H or alkyl group having 1 to 6 carbons, or $R^1$ and $R^2$ together denote alkylene group having 2 to 6 carbons. Preferably, both of $R^1$ and $R^2$ denote H, or $R^1$ and $R^2$ together denote 1,4-butylene group.

The maleimide compound used in the present invention does not have a moiety derived from a bisphenol-S (i.e. phenyl-$SO_2$-phenyl structure).

The maleimide compound is preferably liquid at room temperature, and therefore the moiety (I) bonds to a group that allows the maleimide compound to be liquid, for example, organic group comprising a branched alkyl, alkylene, alkylene oxide, alkylene carboxyl or alkylene amide structure having sufficient length and branch to render the maleimide compound liquid. The maleimide compound may comprise one, or two or more substructures (I). The compound having two of these groups is bismaleimide compound. In addition, a maleimide compound, even if it is not liquid, may be used if the sealant composition becomes liquid as being mixed with other maleimide compound or mixed with other component.

The maleimide compounds in which the moiety (I) bonds to alkyl group or alkylene group (these groups may comprise double bond and saturated alicyclic) include the following compounds:

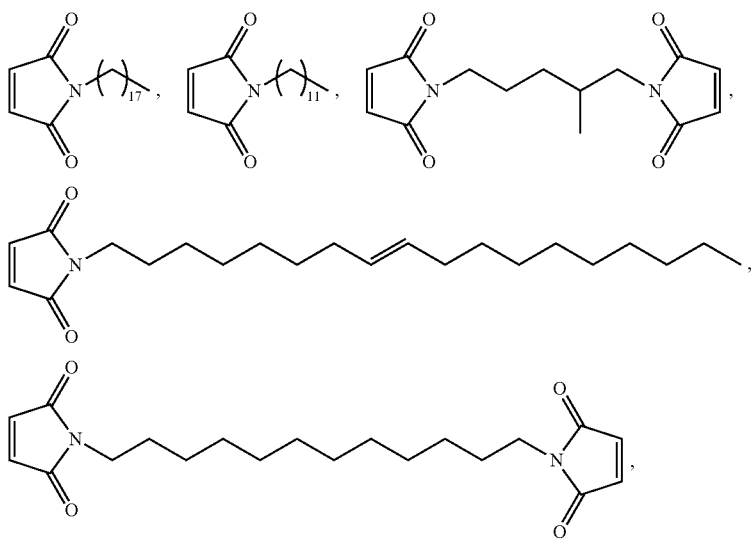

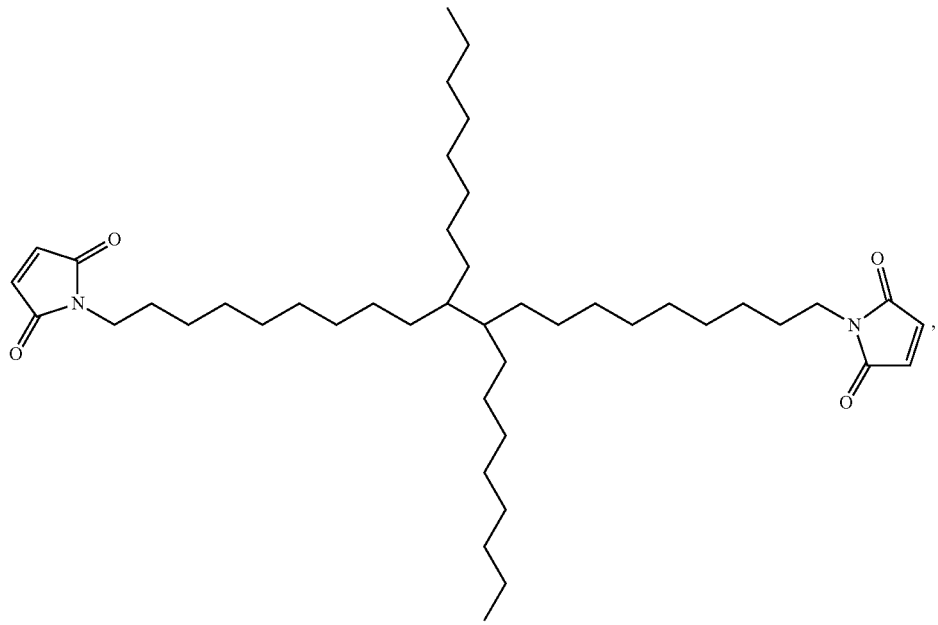
(X-1)

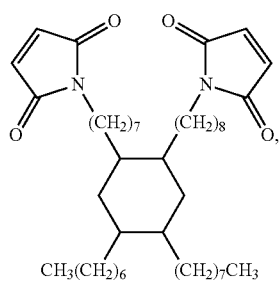
(X-2)

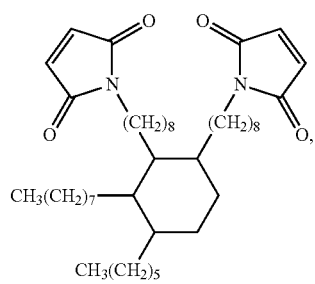
(X-3)

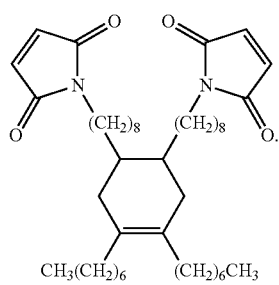

(X-4)

Particularly preferred examples includes stearyl maleimide, oleyl maleimide, behenyl maleimide, and X-BMI {X-bismaleimide; formulae (X-1) to (X-4)} available from Henkel Corporation and the combination thereof. X-BMI is synthesized in accordance with the method described in U.S. Pat. No. 5,973,166 (the disclosure of U.S. Pat. No. 5,973,166 is incorporated into the present specification by reference) from 1,20-diamino-10,11-dioctyl eicosane and/or its cyclic isomeric diamine(s). X-BMI contains one, two or more of 1,20-bismaleimide-10,11-dioctyl-eicosane (the compound represented by the formula (X-1)), 1-heptylene maleimide-2-octylene maleimide-4-octyl-5-heptylcyclohexane (the compound represented by the formula (X-2)), 1,2-dioctylene maleimide-3-octyl-4-hexylcyclohexane (the compound represented by the formula (X-3)), 4,5-dioctylene maleimide-1,2-diheptylcyclohexene (the compound represented by the formula (X-4)) and the like. The bismaleimide compounds represented by the formulae (X-1) to (X-4) may also be solely used preferably.

Other examples of usable maleimide compound include the compound of the following formula:

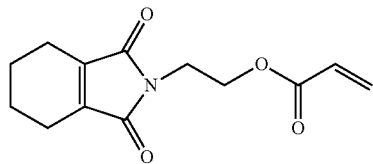 [SMILES: C=CC(=O)OCCN1C(=O)C2=C(CCCC2)C1=O]

(3,4,5,6-tetrahydrophthaloimideethylacrylate).

When the sealant composition contains the maleimide compound, an amount of the maleimide compound may be decided in a wide range, preferably 0.1 to 1,000 parts by weight, more preferably 0.3 to 300 parts by weight, yet preferably 1 to 100 parts by weight on the basis of 100 parts by weight of the partially (meth)acrylated epoxy resin. When the hydrophobic oligomer to be used has maleimide group, the lower limit of the range described above is 0 part by weight.

In a preferred embodiment of the present invention, the sealant composition contains the followings in the proportions below, 5 to 80% by weight of the partially (meth)acrylated epoxy resin, 5 to 80% by weight of the hydrophobic oligomer, 1 to 40% by weight of the latent epoxy-curing agent, and 0.5 to 50% by weight of the maleimide compound (alternatively, 0 to 50% by weight when the hydrophobic oligomer has maleimide group), wherein the total of the components described above is 100% by weight.

The sealant composition may contain a photo initiator when the hydrophobic oligomer has no maleimide group and contains no maleimide compound. The sealant composition may also contain a photo initiator in the least amount possible even the hydrophobic oligomer has maleimide group and/or contains the maleimide compound.

The photo initiator may be a compound which generates radicals by ultraviolet or visible ray photo-irradiation.

The photo radical initiator may include acetophenone-based initiator such as diethoxyacetophenone and benzyl dimethyl ketal, benzoin ether-based initiator such as benzoin and benzoin ethyl ether, benzophenone-based initiator such as benzophenone and methyl o-benzoylbenzoate, α-diketone-based initiator such as butanedione, benzyl and aceto naphthophenone, and thio compound such as methylthioxanthone.

More specific examples include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-1,2-diphenylethan-1-one, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2(hydroxy-2-propyl)ketone, benzophenone, p-phenylbenzophenone, 4,4'-diethylamino benzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenonedimethyl ketal, acetophenonedimethyl ketal, p-dimethylamine benzoate, oligo(2-hydroxy-2-methyl-1-[4-(1-propenyl)phenyl]propanone) and the like.

Particularly preferable initiator has strong absorption in a wavelength region not shorter than 350 nm, and it includes, for example, Irgacure 369 (2-benzyl-2-(dimethylamino)-1-[4-(4-morpholinyl)phenyl]-1-butanone), Irgacure 907 (2-methyl-1-[4-(methylthio)phenyl]-2-(4-morpholinyl)-1-propanone), Irgacure 819 (phenylbis(2,4,6-trimethylbenzoyl)-phosphineoxide), Darocure TPO (diphenyl(2,4,6-trimethylbenzoyl)phosphine oxide) made by Ciba, and the like.

In addition to the photo initiator, known sensitizers may also be used.

An amount of the photo initiator contained in the sealant composition is usually 0.1 to 20 parts by weight, and preferably 0.2 to 5 parts by weight, based on 100 parts by weight of the sum of the partially (meth)acrylated epoxy resin and, if present, (meth)acrylate compounds.

The sealant composition may optionally contain as necessary further a component capable of a photopolymerization reaction such as a (meth)acrylate compound (a monomer and/or oligomer) and/or a vinyl ether compound, and/or a component curable with heat such as an epoxy resin.

The sealant composition may further comprise additives, resin components and the like to improve or modify properties such as flowability, applying property, preserving property, curing property and physical property after curing.

The component that may be contained in the composition as needed includes, for example, organic or inorganic filler, thixotropic agent, silane coupling agent, diluent, modifier, coloring agent such as pigment and dye, surfactant, preservative-stabilizer, plasticizer, lubricant, defoamer, leveling agent and the like; however it is not limited to these. In particular, the composition preferably comprises an additive selected from the group consisting of a filler, a thixotropic agent, and a silane coupling agent.

The filler includes, without particular limitation, for example, inorganic filler such as silica, diatomaceous earth, alumina, zinc oxide, iron oxide, magnesium oxide, tin oxide, titanium oxide, magnesium hydroxide, aluminium hydroxide, magnesium carbonate, barium sulphate, gypsum, calcium silicate, talc, glass bead, sericite activated white earth, bentonite, aluminum nitride, silicon nitride, and the like.

The thixotropic agent includes, without particular limitation, for example, talc, fine particle silica, superfine surface-treated calcium carbonate, fine particle alumina, plate-like alumina; layered compound such as montmorillonite; spicular compound such as aluminium borate whisker, and the like. Among them, talc, fine silica, fine alumina and the like are preferred.

The silane coupling agent includes, without particular limitation, γ-aminopropyltriethoxysilan, γ-mercaptopropyltrimethoxysilan, γ-methacryloxypropyltrimethoxysilane, γ-glycidoxypropyltrimethoxylsilan, SH6062, SZ6030 (above all, Toray-Dow Corning Silicone Inc.), KBE903, KBM803 (above all, Shin-Etsu Silicone Inc.) and the like.

The sealant composition according to the present invention may be obtained by mixing the aforementioned each component by means of, for example, a mixer such as a stirrer having stirring blades and a triple roll mill. The sealant composition is liquid at applying temperature, preferably ambient temperature (working environment temperature), and the materials to be formulated, in particular all the resin materials are not necessarily liquid, but preferably all resin materials are liquid.

The cured product of the sealant composition of the present invention has the flexibility, and therefore, it is suitable for the sealing application of plastic substrates.

The sealant composition is curable through photo-irradiation, in case of UV, with a irradiation energy not higher than 5,000 mJ/cm$^2$, preferably not higher than 2,000 mJ/cm$^2$. Generally, the radiation time is preferably short, for example not longer than 5 minutes, preferably not longer than 3 minutes, more preferably not longer than 1 minute. The sealant composition is also cured by heating within a range of temperature preferably up to 100° C., more preferably up to 80° C. The heating time is arbitrarily selected, for example not longer than 3 hours, preferably not longer than 2 hours, yet preferably not longer than 1.5 hours (typically 1 hour). In a specific embodiment, the highest temperature of heating may be 60° C. or lower for the prolonged time of heating.

The sealant composition according to the present invention is temporally curable through photo-irradiation, which is then finally cured by heating. Therefore, the sealant agent according to the present invention is suitable for manufacturing LCDs, specifically LCDs having plastic substrate(s) by means of the liquid-crystal-one-drop-filling process (ODF).

Thus, the present invention also relates to a method for manufacturing a liquid crystal display having a liquid crystalline layer between a first substrate and a second substrate, by means of a liquid-crystal-one-drop-filling process, wherein the first substrate and the second substrate are formed of plastic;

the method comprising the steps of:

(a) applying the sealant composition described in this application on a sealing region at periphery of a surface of the first substrate;

(b) dropping liquid crystalline on a central area encircled by the sealing region of the surface of the first substrate;

(c) overlaying the second substrate on the first substrate;

(d) performing temporal fixation by photo-irradiating the sealant composition; and (e) performing final fixation by heating the sealant composition.

The first substrate and the second substrate used in the present invention are usually transparent plastic substrates. Generally, transparent electrodes, active matrix elements (such as TFT), alignment film(s), a color filter and the like are formed on at least one of the opposed faces of the two substrates. These constitutions may be modified according to the type of the LCD. The manufacturing method according to the present invention may be thought to be applied for any type of the LCD.

The plastic substrate includes substrates made from plastics such as from polyester, from polyarylate, from polycarbonate and from poly(ether sulfones).

In the step (a), the sealant composition is applied on the periphery portion of the surface (the faces opposing to another substrate) of the first substrate of one of the substrates so as to lap around the substrate circumference in the shape of a frame. As described herein, the portion where the sealant composition is applied in the shape of a frame is referred as a seal region. At this moment, the sealant composition is fluid so that it can be applied and may be applied by a known method such as screen printing and dispensing.

In the step (b), the liquid crystal is then dropped onto the center region surrounded by the seal region in the shape of the frame on the surface of the first substrate. This step is preferably conducted under reduced pressure.

In the step (c), said second substrate is then placed over said first substrate, and photoirradiated in the step (d). By this photoirradiation, the sealant composition cured temporally and shows its strength at such a level that displacement does not occur by handling, whereby the two substrates are temporally fixed.

In the photoirradiation at the step (d), at least the sealant composition may be exposed and it is not necessary to irradiate the entire substrate. Generally, the radiation time is preferably short, for example not longer than 5 minutes, preferably not longer than 3 minutes, more preferably not longer than 1 minute.

In the step (e), heating the sealant composition allows the sealant composition to achieve the final curing strength (final curing), whereby the two substrates are finally fixed.

The thermal curing in the step (e) is generally heated according to a heating profile including a maximum temperature of, preferably, up to 100° C., and more preferably, up to 80° C. The heating time is arbitrarily selected, for example not longer than 3 hours, preferably not longer than 2 hours, yet preferably not longer than 1.5 hours (typically 1 hour). A heating equipment is not particularly restricted, and may be a heating equipment capable of accommodating in its inside the temporally-fixed substrates.

By the aforementioned process, the major part of the LCD panel is completed.

The sealant composition to be used in the present invention may be also used for other applications than the liquid-crystal-one-drop-filling process, where precise assembling without displacement is necessary.

EXAMPLES

The materials shown in Table 1 were sufficiently mixed by a stirrer to give the compositions. As the evaluation of photo curability, samples were prepared by placing 20 mg of the compositions between two sheets of PET substrates. The samples were irradiated with light by a high-pressure mercury lamp for 20 seconds. Technoflux 1H-153 was employed for the high-pressure mercury lamp and its irradiation intensity was set at 100 mW/cm². After the photo irradiation, the samples were checked as to whether two PET substrates had been fixed or not.

Thermal curability was measure by DSC (differential scanning calorimeter). A sample that showed over 90% conversion at 80° C. for 1 hour cure was rated as "good" low temperature curability. A sample that showed less than 50% conversion at 100° C. for 1 hour cure was rated as "bad" low temperature curability.

For the evaluation of flexibility, cured samples with about 10 μm thickness were prepared by UV curing at 100 mW/cm² for 20 seconds with use of Technoflux IH-153 high pressure mercury lamp and post heating at 80° C. for 1 hour (Comparative Example 2 was heated at 120° C. for 1 hour). The sample was rated as "good" flexibility when no fracture occurred upon bending the sample at room temperature, and was rated as "bad" flexibility when a crack was developed.

TABLE 1

| Composition | | Example 1 | Example 2 | Example 3 | Comparative Example 1 | Comparative Example 2 |
|---|---|---|---|---|---|---|
| Partially (meth)acrylated epoxy resin | UVACURE 1561*[1] | 50 | 40 | 40 | 70 | 82 |
| Hydrophobic oligomer | Polybutadiene bismaleimide*[2] | 35 | — | | | |
| | CN 9014*[3] | — | 39 | | | |
| | TE-2000*[4] | — | — | 36 | | |
| Maleimide compound | X-bismaleimide*[5] | — | 10 | 13 | 10 | |
| Photo initiator | Iragacure 651*[6] | — | — | — | — | 2 |
| Latent epoxy-curing agent | EH-4357S*[7] | 14 | 10 | 10 | 19 | — |
| | VDH-J*[8] | — | — | — | — | 15 |
| 3-glycidoxypropyltrimethoxysilane | | 1 | 1 | 1 | 1 | 1 |
| UV light curability | | Good | Good | Good | Good | Good |
| Thermal curability | | Good | Good | Good | Good | Bad |
| Flexibility | | Good | Good | Good | Bad | Bad |

*[1]Partially acrylated bisphenol A epoxy resin, manufactured by Cytec Industries Inc.
*[2]Polybutadiene bismaleimide, manufactured by Henkel Corporation
*[3]Hydrophobic polybutadiene-urethane acrylate oligomer, manufactured by Sartomer LLC
*[4]Hydrophobic polybutadiene-urethance acrylate oligomer, manufactured by Nippon Soda Co., Ltd
*[5]X-bismaleimide, manufactured by Henkel Corporation
*[6]Photoinitiator, manufactured by BASF
*[7]Latent curing agent, manufactured by ADEKA corporation; further grounded to fine powder
*[8]Hydrazine compound, manufactured by Ajinomoto Fine-techno Co., Inc.

As shown in Table 1, all samples exhibited good UV light curability. All samples of Examples 1 to 3 were cured at 80° C. within 1 hour while Comparative Example 2 was not be cured at 100° C. All cured products of Examples 1 to 3 showed very good flexibility. They can be bendable, or even rolled without broken. The Comparative Examples lacked in flexibility. They were broken easily when bended.

INDUSTRIAL APPLICABILITY

The sealant composition of the present invention is suitably used as a sealant for the sealing application of plastic substrates, particularly LCDs having a plastic substrate.

The invention claimed is:
1. A sealant composition comprising:
   a partially (meth) acrylated epoxy resin,
   a maleimide compound,
   a hydrophobic oligomer selected from the group consisting of (meth) acrylate-modified polybutadiene, maleimide-modified polybutadiene, epoxy-modified and epoxylated polybutadiene, wherein a polybutadiene-backbone moiety may be optionally partially or entirely hydrogenated, and
   a latent epoxy-curing agent having an onset of curing at 40° C. or higher, wherein
   the sealant composition does not comprise a photoinitiator, and wherein at 100° C. or lower the sealant composition is cured.
2. The sealant composition according to claim 1, wherein the maleimide compound is selected from compounds that are different from the hydrophobic oligomer if the hydrophobic oligomer have a maleimide group.
3. An article comprising the sealant composition according to claim 1 and a plastic substrate, wherein the sealant composition is used for sealing a plastic substrate.
4. The article according to claim 3, wherein the plastic substrate is a liquid crystal display.
5. A method for manufacturing a liquid crystal display having a liquid crystalline layer between a first substrate and a second substrate, by means of a liquid-crystal-one-drop-filling process, wherein the first substrate and the second substrate are formed of plastic;

the method comprising the steps of:
(a) applying the sealant composition according to claim 1 on a sealing region at periphery of a surface of the first substrate;
(b) dropping liquid crystalline composition on a central area encircled by the sealing region of the surface of the first substrate;
(c) overlaying the second substrate on the first substrate;
(d) performing temporal fixation by photoirradiating the sealant composition; and
(e) performing final fixation by heating the sealant composition.

6. The method according to claim 5, wherein the heating is performed at 100° C. or lower.

7. The sealant composition according to claim 1, wherein the partially (meth)acrylated epoxy resin is liquid and has a viscosity in a range from 1,000 to 1,000,000 cps at 25° C.

8. The sealant composition according to claim 2, wherein the maleimide compound comprises a maleimide compound having one or more substructures represented by moiety (I):

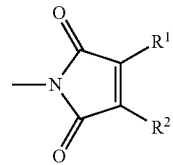

wherein $R_1$ and $R_2$ denote H or alkyl group having 1 to 6 carbons, or $R_1$ and $R_2$ together denote alkylene group having 2 to 6 carbons.

9. The sealant composition according to claim 1, wherein the latent epoxy-curing agent has an onset of curing at 45° C. or higher.

10. The sealant composition according to claim 1, wherein the latent epoxy-curing agent has an onset of curing at 80° C. or lower.

* * * * *

UNITED STATES PATENT AND TRADEMARK OFFICE
CERTIFICATE OF CORRECTION

PATENT NO. : 10,108,029 B2
APPLICATION NO. : 14/190798
DATED : October 23, 2018
INVENTOR(S) : Chenfu Chen Page 1 of 1

It is certified that error appears in the above-identified patent and that said Letters Patent is hereby corrected as shown below:

In the Specification

Column 16, Line 23, change "polybutadiene-urethance" to -- polybutadiene-urethane --.

Signed and Sealed this
Eighteenth Day of June, 2019

Andrei Iancu
*Director of the United States Patent and Trademark Office*